United States Patent
Chiu et al.

(10) Patent No.: US 7,526,198 B1
(45) Date of Patent: Apr. 28, 2009

(54) METHODS OF RESTORATION IN AN ULTRA-LONG HAUL OPTICAL NETWORK

(75) Inventors: Angela Chiu, Holmdel, NJ (US); John L. Strand, Holmdel, NJ (US); Robert Tkach, Little Silver, NJ (US)

(73) Assignee: AT&T Corp., New York, NY (US)

( * ) Notice: Subject to any disclaimer, the term of this patent is extended or adjusted under 35 U.S.C. 154(b) by 484 days.

(21) Appl. No.: 11/289,770

(22) Filed: Nov. 30, 2005

(51) Int. Cl.
 *H04B 10/08* (2006.01)
(52) U.S. Cl. ............................. 398/19; 398/12; 398/16
(58) Field of Classification Search ................. 398/1–5, 398/16, 19
 See application file for complete search history.

(56) References Cited

U.S. PATENT DOCUMENTS 7,113,698 B1 * 9/2006 Ryhorchuk et al. ........... 398/10

2002/0145779 A1 * 10/2002 Strasser et al. ............... 359/124
2004/0190901 A1 * 9/2004 Fang ............................ 398/59

OTHER PUBLICATIONS

Trunking Basics, The Genesis Group [online], © 1997-2004 [retrieved on Aug. 15, 2005], 15 pages. Retrieved from the Internet: <URL: http://www.genesisworld.com/trunking.htm>.
Strand, J. et al., Realizing the Advantages of Optical Reconfigurability and Restoration With Integrated Optical Cross-Connects, Journal of Lightwave Technology, Nov. 2003, pp. 2871-2882, vol. 21, No. 11.

* cited by examiner

*Primary Examiner*—Dzung D Tran

(57) ABSTRACT

A method includes receiving a restoration indicator associated with a path that includes an optical cross-connect (OXC). The OXC is reconfigured from a standby configuration to a restoration configuration in response to the restoration indicator. An optical signal received in a first direction at a first wavelength is optically regenerated to produce an optical signal in the first direction at a second wavelength. An optical signal received in a second direction at the second wavelength is optically regenerated to produce an optical signal in the second direction at the first wavelength.

6 Claims, 7 Drawing Sheets

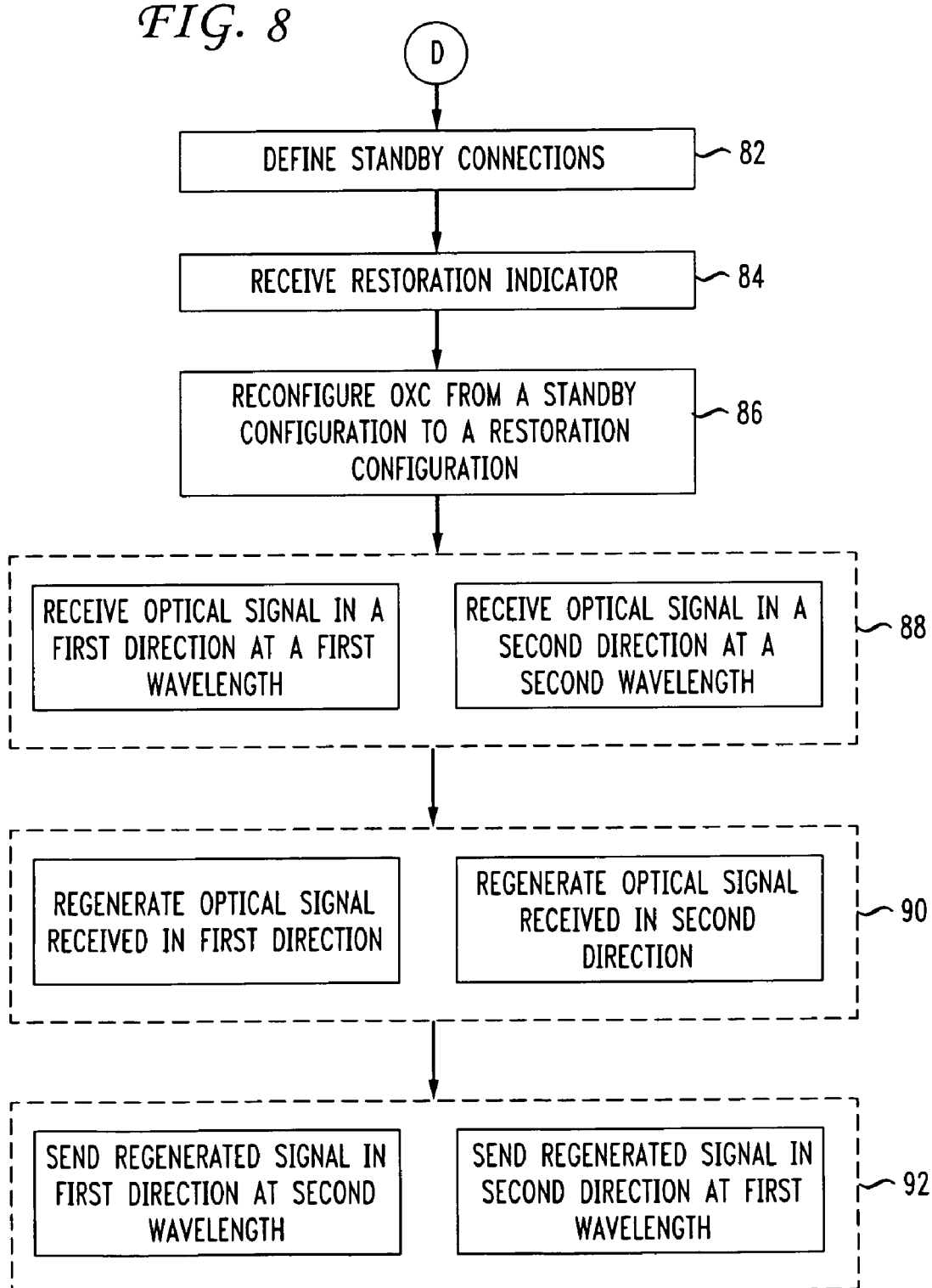

US 7,526,198 B1

METHODS OF RESTORATION IN AN ULTRA-LONG HAUL OPTICAL NETWORK

BACKGROUND

The invention relates generally to ultra-long-haul optical networks and particularly to methods associated with restoring a circuit within an ultra-long haul optical network.

In some known systems, optical-electrical-optical (OEO) regeneration is used to amplify signals in long-haul links. Such OEO regeneration can be performed, for example, in cross-connects that define the nodes within a network. Restoration within such a network is typically performed at these cross-connects such that alternative paths can be defined on-the-fly from a pre-established pool of restoration capacity. Because the transmitted signals for each link between two adjacent nodes within a path each has a given wavelength, known network restoration techniques typically need not manage the wavelengths of transmitted signals along a restoration path.

All-optical networks (i.e., networks using optical regeneration without electrical conversion), however, typically need to manage the wavelength usage for the various links within a restoration path. In addition, unlike networks that use OEO regeneration, networks that use optical regeneration without electric conversion typically need to manage changes in the cross talk and the total-power-per-link resulting from the restoration path.

Thus, a need exists for methods of managing changes in an optical network to accommodate restoration path actuation and wavelength usage in an efficient and effective manner.

SUMMARY OF THE INVENTION

A method includes receiving a restoration indicator associated with a path that includes an optical cross-connect (OXC). The OXC is reconfigured from a standby configuration to a restoration configuration in response to the restoration indicator. An optical signal received in a first direction at a first wavelength is optically regenerated to produce an optical signal in the first direction at a second wavelength. An optical signal received in a second direction at the second wavelength is optically regenerated to produce an optical signal in the second direction at the first wavelength.

BRIEF DESCRIPTION OF THE DRAWINGS

FIG. 8 is a flowchart illustrating a method according to an embodiment of the invention.

DETAILED DESCRIPTION

A method of managing changes (e.g., wavelength usage) in an optical network can include steps performed before the restoration path is needed (also referred to as "hot standby connections"), or after the restoration path has been activated and the transients have been compensated (also referred to as "cold standby connections"). In the former case, restoration paths are pre-determined and are actively maintained until used to replace a failed link elsewhere within the network. For example, a restoration path can include discrete bidirectional links initially maintained between nodes of a network before a failure elsewhere in the network needs to be dynamically restored. In such a configuration, once a failure has occurred, the restoration path can be used to restore the failed path by defining an end-to-end path among the requisite nodes. Each intermediate node can be configured so that eastbound signals for a given channel are received at a first wavelength and sent at a second wavelength. Similarly, westbound signals for a given channel are received at the second wavelength and sent at the first wavelength. Following this example, the intermediate node converts the eastbound signals from the first wavelength to the second wavelength during their optical regeneration, and converts the westbound signals from the second wavelength to the first wavelength during their optical regeneration.

A method according to an embodiment of the invention includes receiving a restoration indicator associated with a path that includes an optical cross-connect (OXC). The OXC is reconfigured from a standby configuration to a restoration configuration in response to the restoration indicator. An optical signal received from a first direction at a first wavelength is optically regenerated to produce an optical signal sent in the first direction at a second wavelength. An optical signal received from a second direction at the second wavelength is optically regenerated to produce an optical signal sent in the second direction at the first wavelength.

In another embodiment, a method includes receiving a first test signal from a first OXC at a second OXC. The first test signal has a first wavelength. The second OXC has a set of wavelength-selective switches. The first test signal is passed at a first wavelength-selective switch from the set of wavelength-selective switches, while other signals at the first wavelength are blocked. A second test signal is sent from the second OXC to the first OXC. The second test signal has the first wavelength. Transients associated with the first test signal and the second test signal are compensated for to define a standby connection. In some embodiments, the first test signal is the same signal as the second test signal. For example, the first test signal is looped through the second OXC and sent back to the first OXC.

Figure 1:
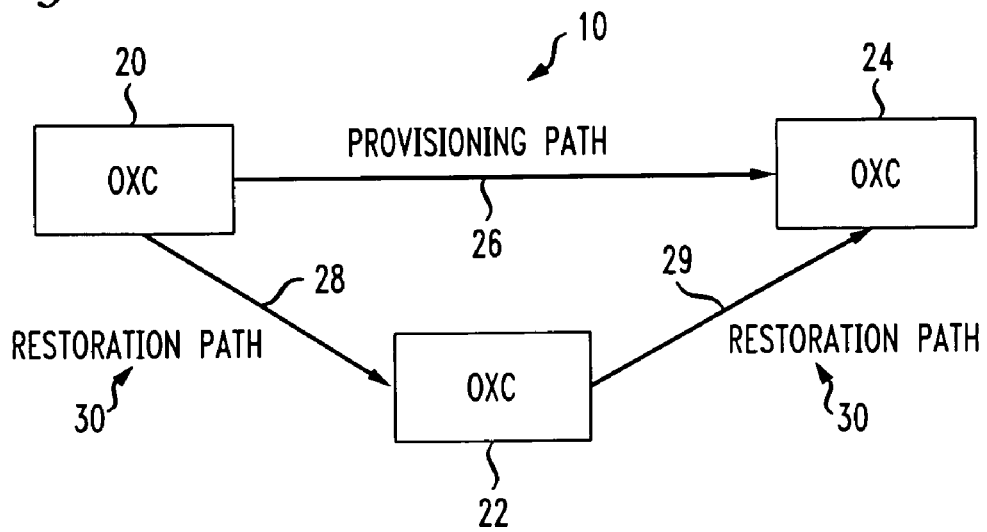
FIG. 1 is a schematic illustration of a portion of a long-haul optical network.

FIG. 1 is a schematic representation of a portion of an optical network 10 having multiple OXCs 20, 22 and 24. An OXC as used herein can be, for example, an integrated optical cross-connect (i.e., a generalized optical add-drop multiplexer that allows express wavelengths to be optically cross-connected through an integrated OXC fabric). An integrated OXC can also include dense wavelength division multiplexing (DWDM) functionality. An OXC can be an optical add-drop multiplexer (OADM), which allows the signals at some wavelengths and/or formats (for example, OC-48 or OC-192) to pass through optically, while others are routed to terminating equipment or regenerators. An OXC can use, for example, broadcast-and-select concepts. As described herein, an OXC is shown as the only component at a particular node within the network, but this is for ease of illustration only. It should be understood that at any given node within a network multiple components can exist with an OXC.

OXC 20 is in communication with OXC 24 via a provisioning path 26 along a first path within the network 10. The provisioning path 26 is the designated path of communication between OXC 20 and OXC 24. If a failure occurs in the circuit, such that OXC 20 can no longer communicate with OXC 24 via provisioning path 26, a new route or path can be established. One such route or path is illustrated as restoration path 30, which includes a link 28 between OXC 20 and OXC 22, and a link 29 between OXC 22 and OXC 24.

Figure 2:
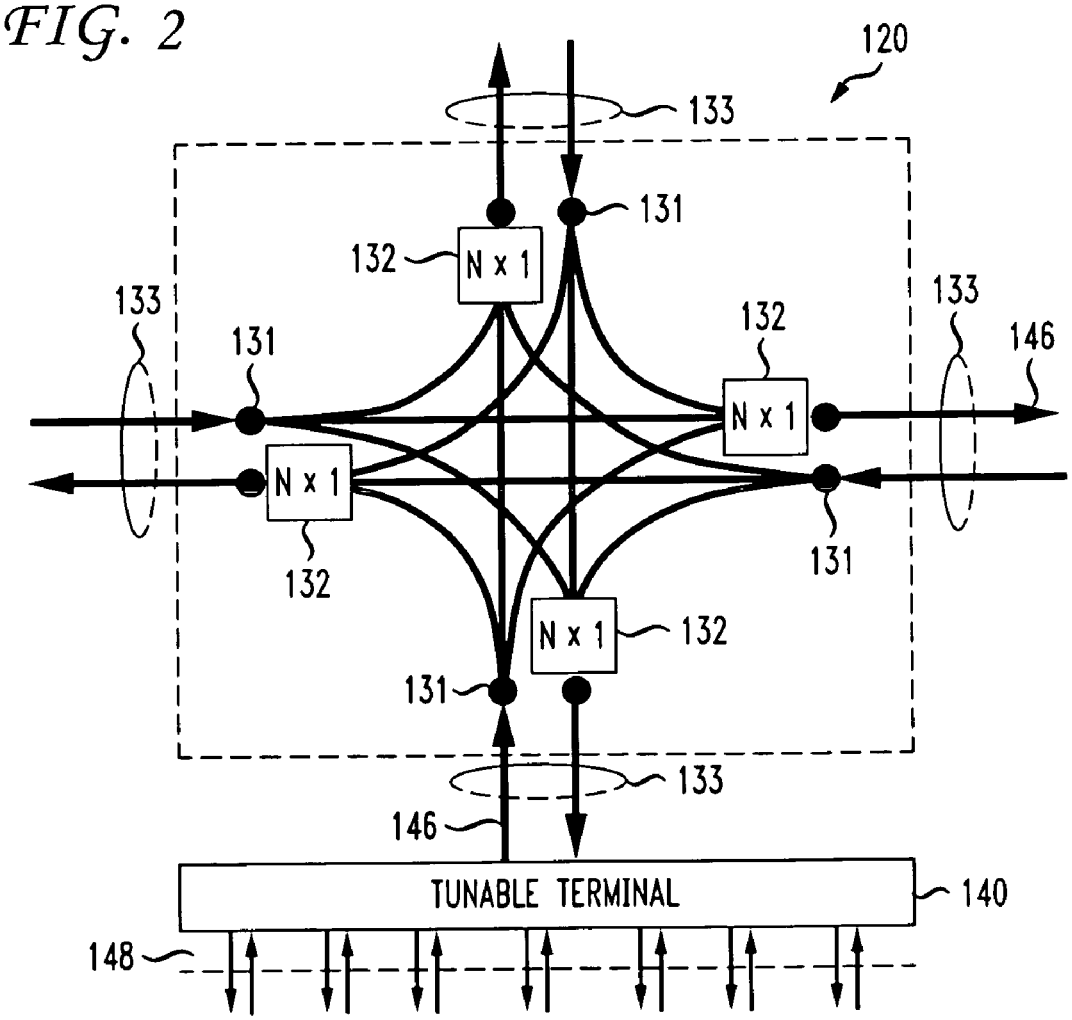
FIG. 2 is a schematic illustration of an optical cross-connect according to an embodiment of the invention.
Figure 3:
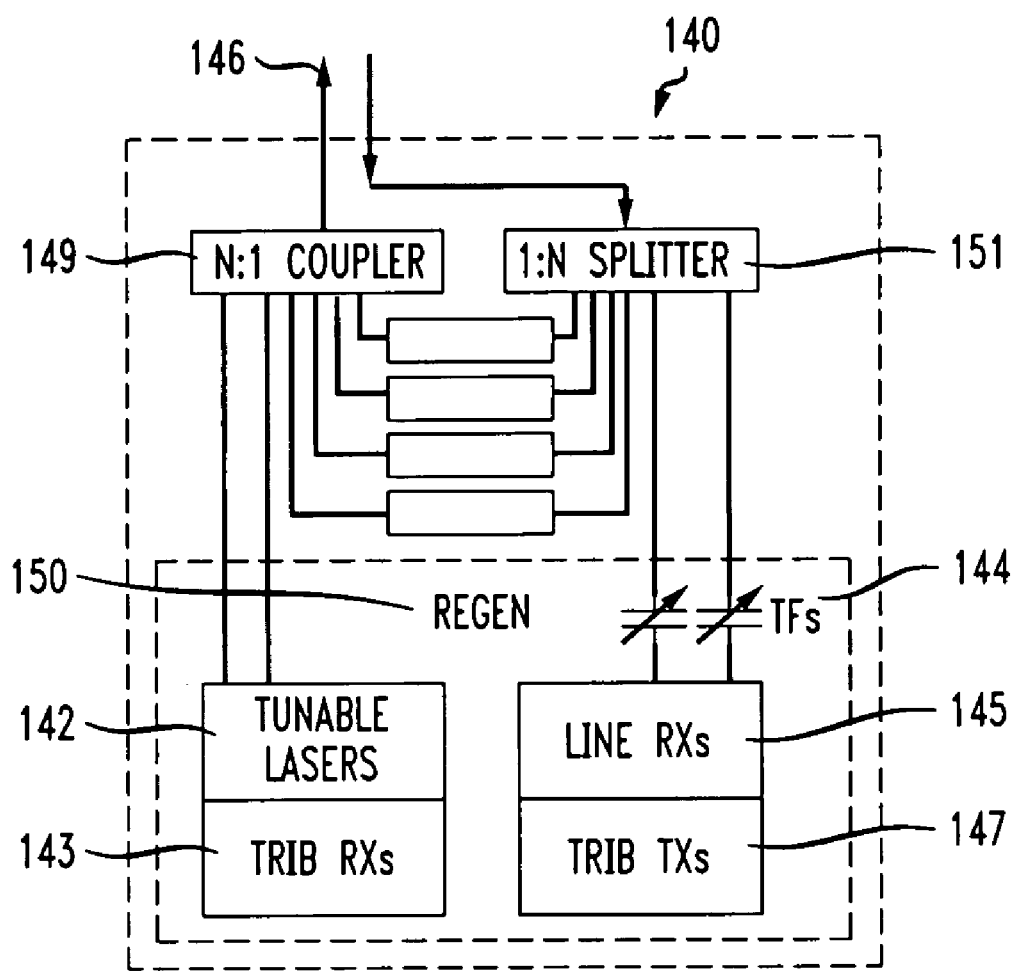
FIG. 3 is a schematic illustration of a tunable terminal according to an embodiment of the invention.

An example of the architecture of an OXC is shown in FIGS. 2 and 3. An OXC 120 includes a set of splitters 131 and N×1 wavelength-selective switches 132 at each port from a set of drop/add ports 133. The OXC 120 also includes tunable terminals 140 each in communication with a respective drop/add port 133. Although only one tunable terminal 140 is shown in FIG. 2, each drop/add port 133 can be in communication with a separate tunable terminal 140. The drop-side interfaces of each the drop/add ports 133, can use, for example, standard short reach (SR) optical interfaces, such as interfaces 148, at the same frequency. The drop-side interfaces can be connected to routers or cross-connects, such as the Core Director cross-connect manufactured by Ciena. Each drop/add port 133 is also in communication with an input/output fiber, such as fiber 146 shown in FIG. 2.

The tunable terminal ("terminal") 140 is illustrated in more detail in FIG. 3. The terminal 140 includes one or more regenerators 150 (labeled as "Regen"), an N:1 coupler 149 and a 1:N splitter 151. Each regenerator 150 can include a tunable laser 142, a transmitter interface board 143 (labeled as "Trib TXs"), a receiver interface board 147 (labeled as "Trib RXs"), filters 144, a receiver 145, and can also include 3R (regeneration technology including three processes: re-shaping, re-timing, and re-amplification) electronics (not shown).

The splitters 131 can be configured to send copies of each signal entering the OXC 120 to each remaining add/drop port 133. The N×1 wavelength-selective switches 132 can be configured to select which of the signals at a given wavelength to send on the output fiber 146. These devices can simultaneously provide power equalization at a channel level. The terminal 140 can add and drop signals at a given add/drop port 133. The filters 144 allow signals of any wavelength at the terminal/switch fabric interface 148 to be routed to any tributary transmit/receive port (not shown).

Figure 4:
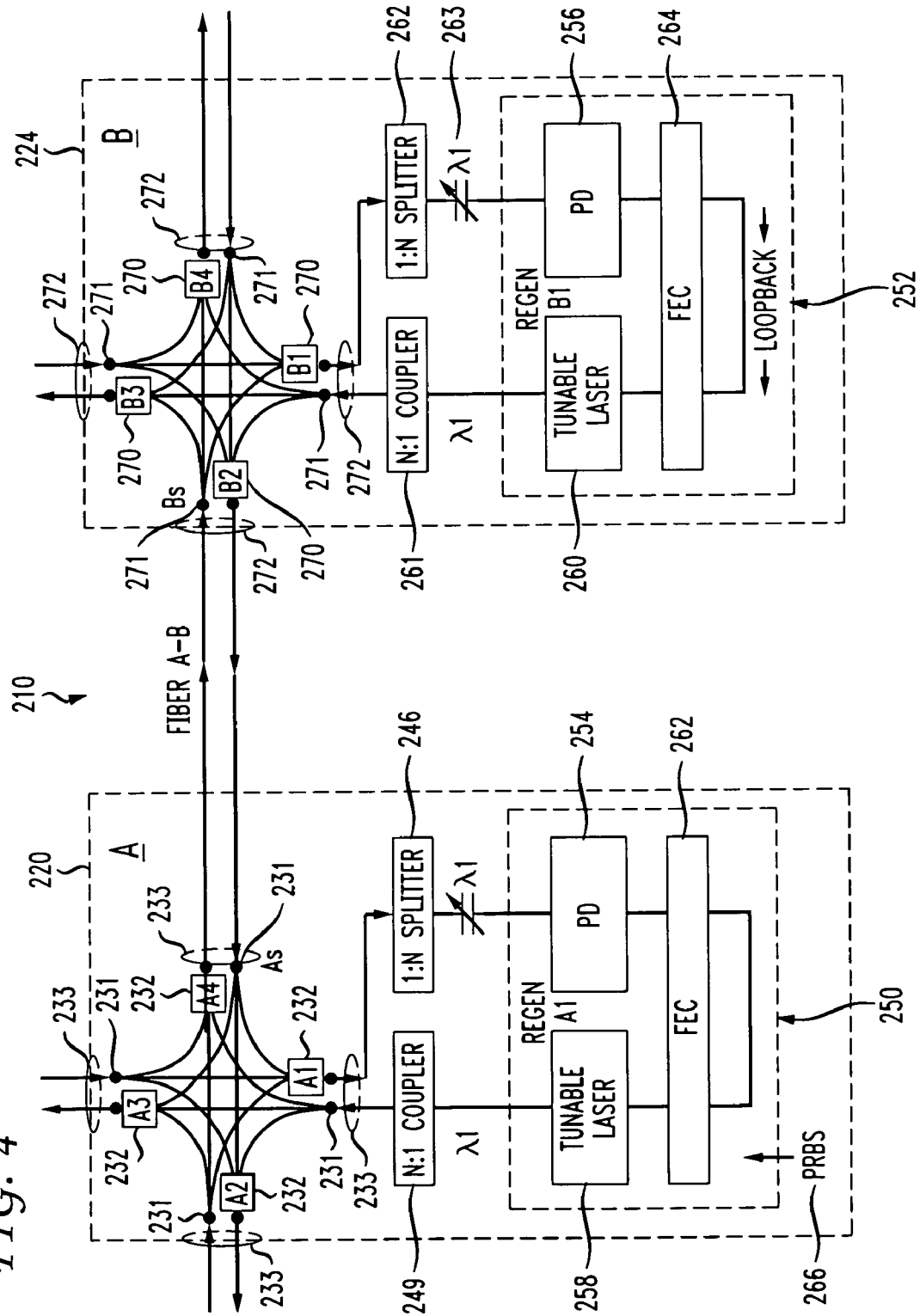
FIG. 4 is a schematic illustration of a portion of a long-haul optical network according to an embodiment of the invention.

FIG. 4 illustrates a portion of an optical network 210 including an OXC 220 (node A) in communication with an OXC 224 (node B) via the fibers labeled "Fiber A-B." OXC 220 includes a set of wavelength-selective switches (WSS) 232 and splitters 231 at add/drop ports 233. The OXC 220 can also include one or more regenerators at each add/drop port 233, however, only a regenerator 250 (labeled "Regen A1") is shown in FIG. 4. The regenerator(s) can be unidirectional. The OXC 220 also includes a N:1 coupler 249, a 1:N splitter 246, and filter 244. The regenerator 250 includes a tunable laser 258, a Forward Error Correction ("FEC") module 262, and a photo-diode (PD) 254 configured to detect incoming signals.

The OXC 224 similarly includes a set of WSS 270 and splitters 271 at add/drop ports 272. The OXC 224 also includes one or more regenerators, although only a regenerator 252 (labeled "Regen B1") is shown in FIG. 4. The OXC 224 also includes a N:1 coupler 261, a 1:N splitter 262, and a filter 263. The regenerator 252 includes a tunable laser 260, a PD 256, and a FEC module 264.

Establishing a Hot-Standby Connection

In an ultra-long-haul (ULH) system, if a failure occurs along a provisioned path, a new path can be provisioned (i.e., a restoration path can be established). A new path is normally provisioned by tuning a laser and a receiver to a desired wavelength. If the restoration path is relatively long, several laser/receiver pairs in sequence can be used. When a restoration path is established, non-uniform power transients introduced by the new wavelength can be stabilized. This stabilization of power equalization can take many seconds, far longer than may be acceptable for all restoration situations.

A method according to an embodiment of the invention includes pre-establishing a set of "hot-standby" optical connections between regenerators in OXCs along an alternate or restoration path within a network. When needed for restoration, the hot-standby optical connections can be dynamically connected together in series to provide the desired restoration path. Because the hot-standby connections are pre-established, the optical transients associated with activating lasers will not be an issue at the point in time when restoration is needed. This can allow a restoration path to be established much more rapidly.

For example, to establish a hot-standby connection between OXC 220 and OXC 224 on a wavelength $\lambda_1$, the first step is to generate a test signal at regenerator 250 (Regen A1). For example, the FEC module 262 in regenerator 250 can generate a pseudo-random bit sequence (PRBS) test signal 266. The appropriate tunable laser, such as laser 258, tunes to $\lambda_1$ and transmits the test signal 266. The wavelength-selective switch (WSS) 232 (labeled as "A4" in FIG. 4) passes the test signal 266 to the fiber A-B, blocking other potential signals with wavelength $\lambda_1$. The test signal 266 travels from OXC 220 to OXC 224 over the Fiber A-B. Although one or more optical amplifiers can exist between OXC 220 and OXC 224, such optical amplifiers are not shown for purposes of simplicity and clarity. In addition, other OXCs can exist between OXC 220 and OXC 224, which are not participating in the establishment of this connection and are therefore not included in FIG. 4. When the test signal 266 arrives at OXC 224, the test signal 266 is broadcast by the splitter 270 (labeled "Bs" in FIG. 4) to all the output ports, i.e., WSS B1, B3, and B4. WSS B1 is configured to pass signals having a wavelength $\lambda_1$ so that the test signal 266 is passed from splitter 270 (labeled Bs in FIG. 4) and all other potential signals at this wavelength $\lambda_1$ are blocked.

The regenerator 252 (Regen B1) then re-transmits the received test signal 266 back to OXC 220. For example, this can be accomplished by the receiver filter 262 located before regenerator B1 and tuned to wavelength $\lambda_1$. The test signal 266 is detected by the PD 256, and the FEC module 264 of regenerator 252 (Regen B1) uses a loopback mode and re-transmits the same test signal 266 on wavelength $\lambda_1$ using the tunable laser 260 on the regenerator 252 (Regen B1). In some embodiments, the regenerator 252 (Regen B1) can generate a second test signal to send back to OXC 220 instead of re-sending the original test signal 266.

The regenerated test signal 266 on wavelength $\lambda_1$ is then passed through WSS B2 and travels from OXC 224 to OXC 220 over the Fibers A-B. At OXC 220, the splitter 231 (labeled as As in FIG. 4) sends the test signal 266 to all output ports (i.e., WSS A1, A2, A3, and A4). WSS A1 passes the wavelength $\lambda_1$ from splitter 231 (labeled as As in FIG. 4) and blocks all other signals. The regen 250 (Regen A1) then receives the test signal 266.

The above-described process establishes a bi-directional connection at wavelength $\lambda_1$ between OXC 220 and OXC 224. During the hot-standby set-up process, the ULH network deals with any associated transients using various power equalization technologies to achieve the desired quality of service (QoS). The test signal 266 is generated at one end and loopbacked at the other end, and its individual QoS can be monitored.

Restoring a Service Connection After a Failure

Figure 5:
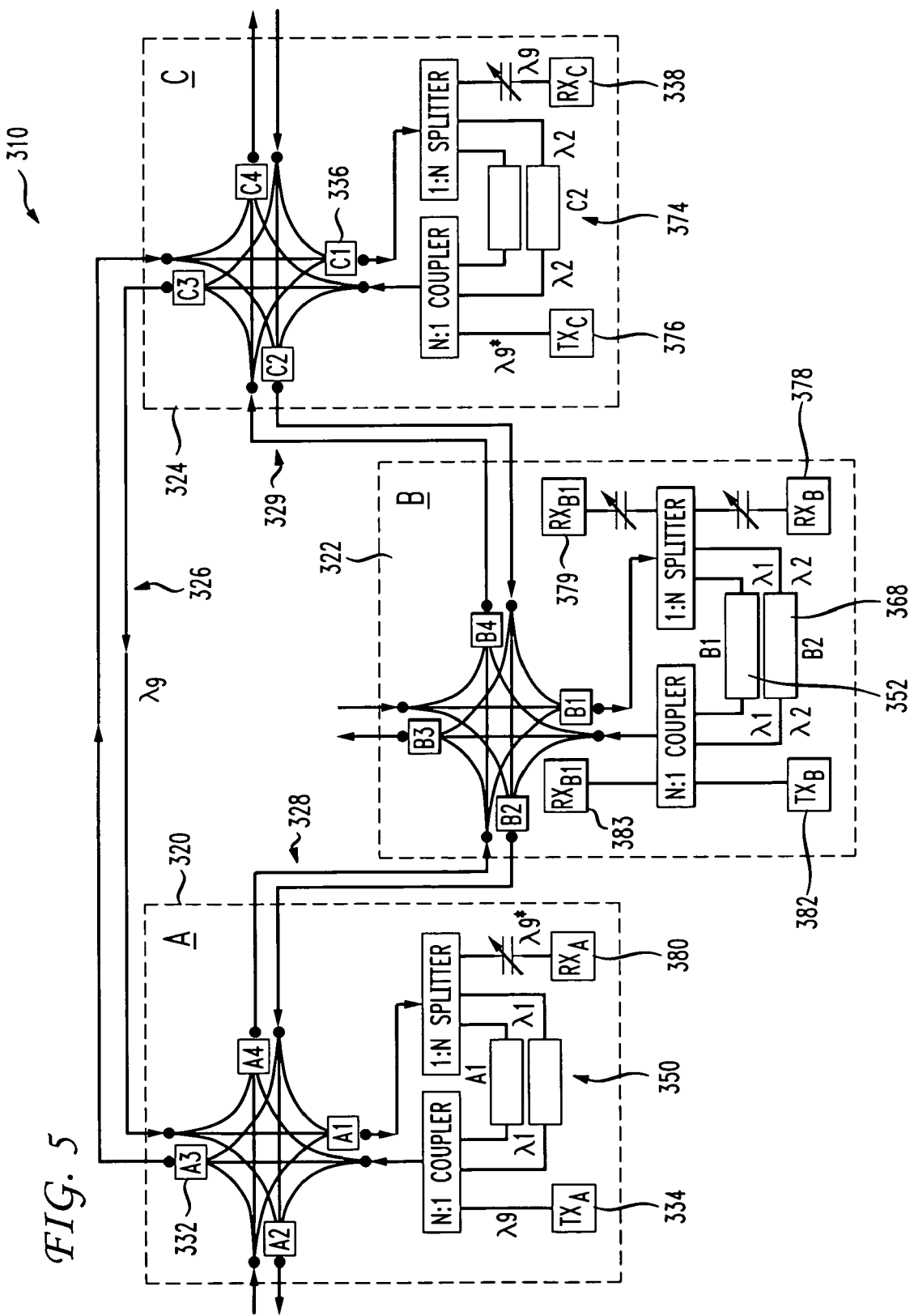
FIG. 5 is a schematic illustration of a portion of a long-haul optical network according to an embodiment of the invention.
Figure 6:
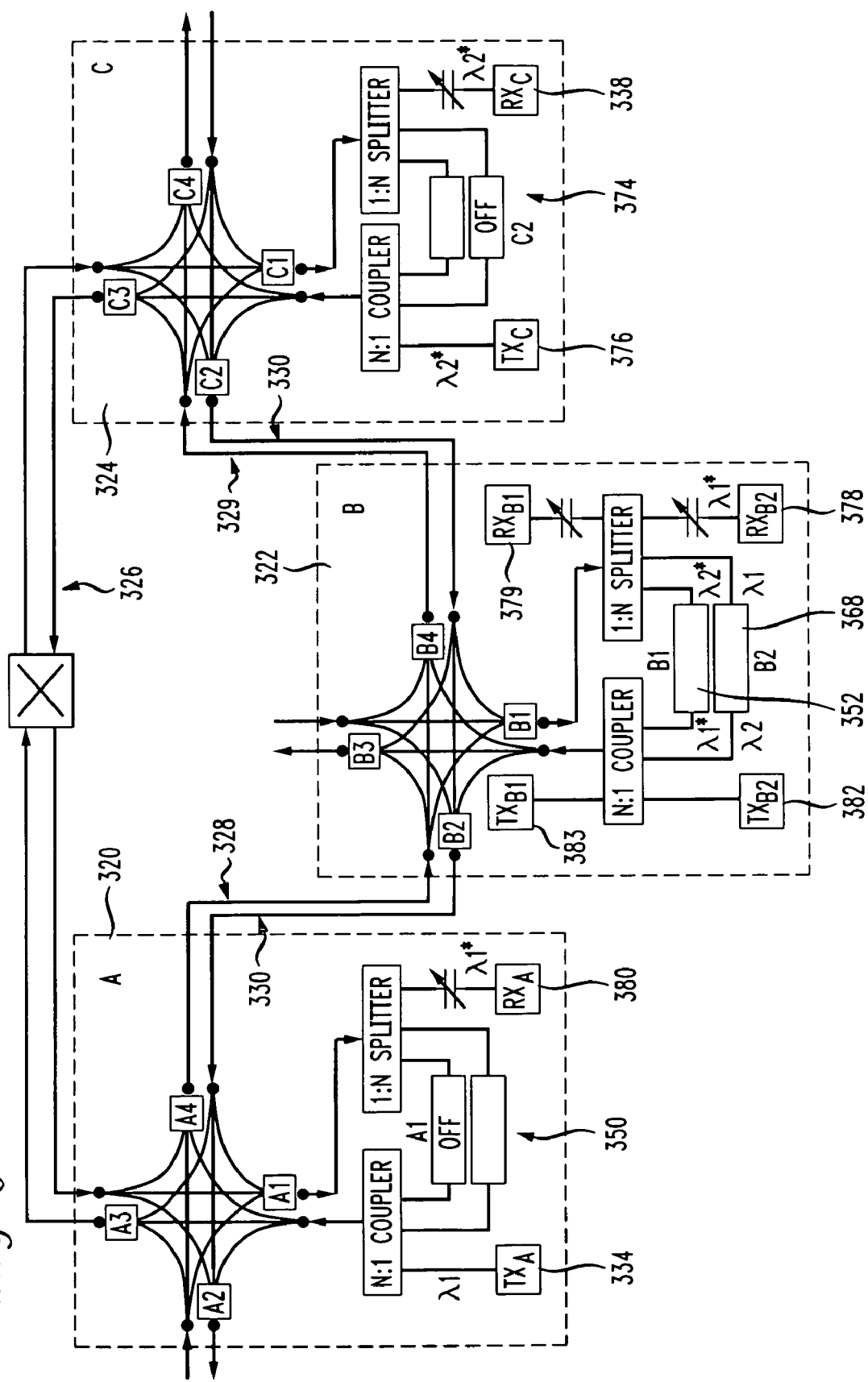
FIG. 6 is a schematic illustration of a portion of a long-haul optical network according to an embodiment of the invention.

FIGS. 5 and 6 illustrate a portion of another example of an optical network. A network 310 includes an OXC 320 (labeled "A"), an OXC 322 (labeled "B"), and an OXC 324 (labeled "C"). The network 310 includes a working connection for signals having a wavelength λ9 from OXC 320 to OXC 324. This connection can be a direct or provisioned path defined by a fiber pair 326. In normal operation, a transmitter 334 (TX$_A$) at OXC 320 (node A) is tuned to wavelength λ9. The OXC 320 can establish a unidirectional A-to-C connection at wavelength λ9. Signals having this wavelength are passed by a wavelength-selective switch (WSS) 332 (labeled A3) and blocked by a WSS A2 and WSS A4. At OXC 324, the signals having wavelength λ9 are passed by a WSS 336 (labeled C1) and terminated by a receiver (RX$_C$) 338, which is tuned to frequency λ9. The reverse connection, from node C to node A, is done in an analogous manner. To avoid confusion, signals in the reverse direction C-A are indicated as λ9\* to distinguish them from signals in the direction A-C.

A hot-standby connection can be established between OXC 320 and OXC 322 for signals having a wavelength λ1, using a regenerator 350 (labeled "A1") at OXC 320 and a regenerator 352 (labeled "B1") at OXC 322. Likewise, a hot-standby connection can be established between OXC 322 and OXC 324 for signals having a wavelength λ2, using a regenerator 368 (labeled "B2") at OXC 322, and a regenerator 374 (labeled "C2") at OXC 324. The method of setting up these hot-standby connections can done using the same process as described above for the embodiment illustrated in FIG. 4.

If and when a failure occurs on the direct A-C provisioned path on fiber pair 326 that results in signals at wavelength λ9 to not be delivered, the communication between OXC 320 and OXC 324 can be restored on a path 330 (see FIG. 6) that includes a link 328 between OXC 320 and OXC 322, and a link 329 between OXC 322 and OXC 324 using the hot-standby connections previously established.

As shown in FIG. 6, when a failure X occurs along path 326, the regenerator 350 at OXC 320 can turn its laser (not shown) off, as a transmitter 334 (TX$_A$) tunes to wavelength λ1 with the same power level regenerator 350 had formerly used for its transmitter. At OXC 324, the regenerator 374 turns its laser (not shown) to off, as a transmitter 376 (TX$_C$) tunes to wavelength λ2 with the same power level the regenerator 374 had formerly used for its transmitter.

At OXC 322, the regenerator 352 (labeled B1) tunes a receiver 379 from λ1 to λ2, and the regenerator 368 (labeled B2) tunes a receiver 378 from λ2 to λ1. Simultaneously, regenerator B1 switches from a loopback mode (e.g., test mode) to a regen mode and regenerates λ2 onto λ1. Similarly, regenerator B2 switches from loopback mode to a regen mode and regenerates λ1 onto λ2.

After this is completed, at OXC 320 a receiver 380 (RX$_A$) tunes from wavelength λ9 to λ1, and at OXC 324 a receiver 338 (RX$_C$) tunes from wavelength λ9 to λ2. After this, the restoration process is complete and the restoration path 330, including link 328 between OXC 320 and OXC 322 and link 329 between OXC 322 and OXC 324, is established.

FIG. 6 illustrates the wavelengths at each OXC after the restoration is complete. The wavelengths associated with the reverse direction C-B and B-A flows are indicated as λ2\* and λ1\*, respectively. The above-described process of establishing a restoration path on an as-needed basis when a failure occurs along the provisioned path, can be controlled in a number of ways.

Methods of Establishing a Restoration Path

Figure 7:
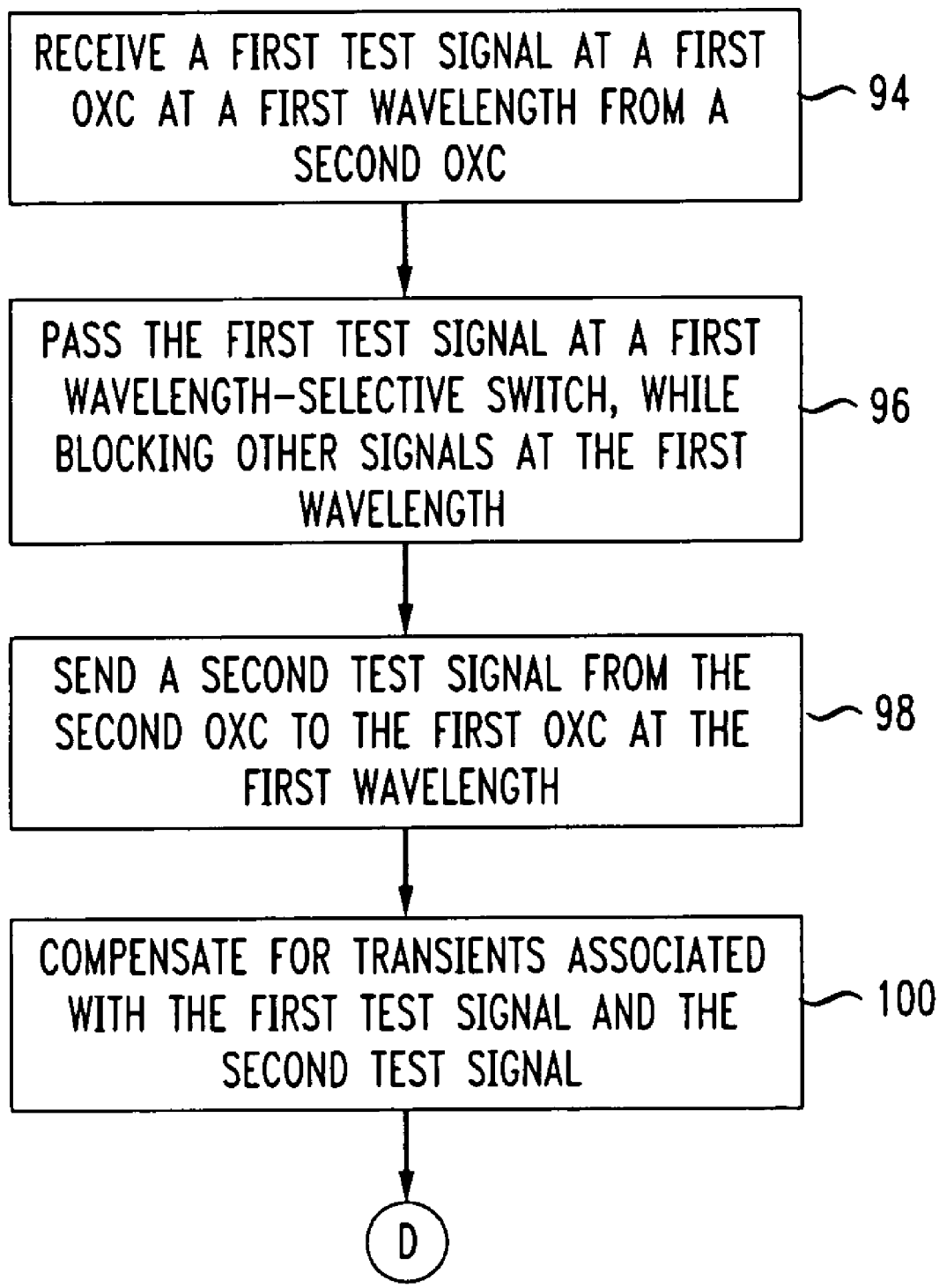
FIG. 7 is a flowchart illustrating a method according to an embodiment of the invention.

A method of establishing a hot-standby connection between a first OXC and a second OXC is illustrated in a flow chart in FIG. 7. The method includes at step 94, receiving a first test signal at the first OXC at a first wavelength from the second OXC. Next, at step 96 the first test signal is passed by a first wavelength selective switch at the first OXC, while the first wavelength selective switch blocks other signals at the first wavelength. A second test signal is sent from the first OXC to the second OXC at step 98. The second test signal can be the same test signal as the first test signal loopbacked to the second OXC. At step 100, transients associated with the test signal are compensated for at both the first OXC and the second OXC.

A method of establishing a restoration path is illustrated in a flowchart in FIG. 8. The flowchart of FIG. 8 continues from the method described in FIG. 7 (see label D at the bottom of the flowchart of FIG. 7 and the top of the flowchart of FIG. 8) as is described below. A method includes defining one or more hot-standby connections at step 82. For example, a first OXC located between a second OXC and a third OXC along a path within an optical network can be set-up as a hot-standby connection. The process of establishing the hot-standby connection was described above and was illustrated in the flowchart in FIG. 7. At step 84, a restoration indicator is received at the first OXC. A restoration indicator can be, for example, a signal transmitted within a network that is associated with a path between the second OXC and the third OXC. The indicator notifies one or more OXCs (e.g., the first OXC) located between the second OXC and the third OXC that a restoration path is needed. At step 86, the first OXC between the second OXC and the third OXC is reconfigured from a standby configuration to a restoration configuration as previously described. The first OXC can then receive an optical signal in a first direction at a first wavelength from the second OXC and can receive an optical signal in a second direction at a second wavelength from the third OXC at step 88. At step 90, the first OXC can regenerate the optical signal received in the first direction and regenerate the optical signal received in the second direction. The first OXC can send the regenerated signal that was received in the first direction at the first wavelength, in the first direction at the second wavelength, and can send the regenerated signal received in the second direction at the second wavelength in the second direction at the first wavelength.

Cold Standby Embodiment

In the establishment of a restoration path previously described, the regenerator cards used at the two ends of the restoration path, regenerator 350 (A1) and regenerator 374 (C2), are only used to generate and receive test signals for the hot-standby connections A-B and B-C. Thus, the regenerator card 350 (A1) and the regenerator card 374 (C2) are not used on the restoration path A-B-C. Instead, the original transmitters and receivers used by the connection between OXC 320 and OXC 324 (i.e., TX$_A$, RX$_A$ and TX$_C$, RX$_C$), are retuned and utilized. The regenerator cards at the OXC 322, regenerator 352 (B1) and regenerator 368 (B2), are both used on the restoration path to connect the two hot-standby connections.

In an alternative embodiment, the regenerators at each of the end nodes, OXC 320 and OXC 324, in the example shown in FIGS. 5 and 6, are eliminated since they are only used for test signals. In this embodiment, a standby connection between OXC 320 and OXC 322, and between OXC 322 and OXC 324 would not be "on" prior to a failure. This type of standby connection is referred to as a "cold-standby" connection. As a result, a different wavelength distribution occurs after the restoration path is established. This can possibly result in slowing down the ULH convergence process after a failure, due to the non-optimal power equalization state.

A cold-standby connection can, however, provide significant cost savings in some cases as compared to a hot-standby connection. For example, in the example network described above in FIGS. 5 and 6, a total of 4 regenerator cards are used with the hot-standby connections (i.e., regenerator cards A1, B1, B2 and C2). For a cold-standby connection applied to the OXCs illustrated in FIGS. 5 and 6, only 2 regenerator cards are used (i.e., B1 and B2). The total savings can be significant when a large number of connections between the original end nodes (OXC A and OXC C) are to be restored. For example, if there are 20 OC192 connections between OXC 320 and OXC 324, and each OXC includes 20 regenerator cards, a reduction of 40 regenerator cards can be realized.

Thus, an embodiment including a cold-standby connection is similar to the above described configuration for a hot-standby connection except the standby regenerator cards, A1 and C2, at the two end nodes (OXC 320 and OXC 324) are eliminated. In the event of a failure in the connection between OXC 320 and OXC 324, the two original end transmitter and receiver pairs $TX_A/RX_A$ and $TX_C/RX_C$, can be tuned to the same frequencies on the corresponding standby connections, $\lambda 1$ and $\lambda 2$, respectively, in the same manner they are retuned to such frequencies in the hot-standby embodiment. Thus, a cold-standby connection establishes a restoration path at a slower rate than a hot-standby connection, since switches tune to the designated wavelength during the establishment of the restoration path. In contrast, in the hot-standby connection, the designated wavelength has already been established and only needs to be turned on when a restoration path is needed. In a cold-standby situation, the power equalization convergence process can be improved by using a testing regenerator card at each end node to send and receive testing signals periodically on all the cold-standby connections that terminate at that node using the corresponding wavelength.

CONCLUSION

While various embodiments of the invention have been described above, it should be understood that they have been presented by way of example only, and not limitation. For example, a network can include a variety of different components not illustrated herein. In addition, the OXCs are represented as being the only component at a particular node for illustrations purposes only. A given node within a network can include multiple components, with the OXCs being a sub-component within a node.

What is claimed is:

1. A method, comprising:
receiving a first test signal from a first optical cross-connect (OXC) at a second OXC, the first test signal having a first wavelength, the second OXC having a plurality of wavelength-selective switches;
passing the first test signal at a first wavelength-selective switch from the plurality of wavelength-selective switches while blocking other signals at the first wavelength;
sending a second test signal from the second OXC to the first OXC, the second test signal having the first wavelength; and
compensating for transients associated with the first test signal and the second test signal to define a standby connection.

2. The method of claim 1, wherein the standby connection is a first standby connection, the method further comprising:
receiving a third test signal from a third OXC at the second OXC, the third test signal having a second wavelength;
passing the third test signal at a second wavelength-selective switch from the plurality of wavelength-selective switches while blocking other signals at the second wavelength;
sending a fourth test signal from the second OXC to the third OXC, the fourth test signal having the second wavelength; and
compensating for transients associated with the third test signal and the fourth test signal to define a second standby connection.

3. The method of claim 1, further comprising:
after the compensating, receiving a restoration indicator associated with a path that includes the second OXC;
reconfiguring the second OXC from a standby configuration to a restoration configuration in response to the restoration indicator; and
optically regenerating an optical signal received in a first direction at the first wavelength to produce an optical signal in the first direction at a second wavelength.

4. The method of claim 1, further comprising:
after the compensating, receiving a restoration indicator associated with a path that includes the second OXC;
reconfiguring the second OXC from a standby configuration to a restoration configuration in response to the restoration indicator;
optically regenerating an optical signal received in a first direction at the first wavelength to produce an optical signal in the first direction at a second wavelength; and
sending the optically regenerated signal to a third OXC in the first direction at the second wavelength.

5. The method of claim 1, further comprising:
after the compensating, receiving a restoration indicator associated with a path that includes the second OXC;
reconfiguring the second OXC from a standby configuration to a restoration configuration in response to the restoration indicator;
optically regenerating an optical signal received in a first direction at the first wavelength to produce an optical signal in the first direction at a second wavelength; and
optically regenerating an optical signal received in a second direction at the second wavelength to produce an optical signal in the second direction at the first wavelength.

6. The method of 1, further comprising:
after the compensating, receiving a restoration indicator associated with a path that includes the second OXC;
reconfiguring the second OXC from a standby configuration to a restoration configuration in response to the restoration indicator;
optically regenerating an optical signal received in a first direction at the first wavelength to produce an optical signal in the first direction at a second wavelength;
optically regenerating an optical signal received in a second direction at the second wavelength to produce an optical signal in the second direction at the first wavelength; and
sending the optically regenerated signal received in the second direction to the first OXC in the second direction at the first wavelength.

* * * * *